United States Patent
Slutskii et al.

(10) Patent No.: US 10,350,617 B1
(45) Date of Patent: Jul. 16, 2019

(54) COMPOSITION OF AND NOZZLE FOR SPRAYING A SINGLE-COMPONENT POLYURETHANE FOAM

(71) Applicants: Konstantin Dragan, Moscow (RU); Vitalii Titorov, Moscow (RU)

(72) Inventors: Sergei Slutskii, Moscow Oblast (RU); Vitalii Titorov, Moscow (RU)

( * ) Notice: Subject to any disclaimer, the term of this patent is extended or adjusted under 35 U.S.C. 154(b) by 0 days.

(21) Appl. No.: 15/955,479

(22) Filed: Apr. 17, 2018

Related U.S. Application Data

(60) Division of application No. 15/429,586, filed on Feb. 10, 2017, which is a continuation-in-part of
(Continued)

(51) Int. Cl.
*C08K 5/00* (2006.01)
*B05B 1/06* (2006.01)
(Continued)

(52) U.S. Cl.
CPC .............. *B05B 1/06* (2013.01); *B05B 7/0025* (2013.01); *C08K 5/02* (2013.01); *C08K 5/521* (2013.01);
(Continued)

(58) Field of Classification Search
CPC .............. C08G 18/3206; C08G 18/7671; C08J 9/0042; C08J 9/141; C08J 2203/14;
(Continued)

(56) References Cited

U.S. PATENT DOCUMENTS 1,559,655 A * 11/1925 Thompson .............. B05B 1/046
239/521
2,722,458 A * 11/1955 Wahlin .................... B05B 1/042
239/597
(Continued)

FOREIGN PATENT DOCUMENTS

| CA | 1137698 | 12/1982 |
| GB | 1273554 | 5/1972 |
| WO | 2015/041552 | 3/2015 |

OTHER PUBLICATIONS

TAP Plastics, Vinyl Tubing, Apr. 15, 2012, http://www.tapplastics.com/product/plastics/plastic_rods_tubes_shapes/vinyl_tubing/145.

*Primary Examiner* — Viet Le
(74) *Attorney, Agent, or Firm* — Cislo & Thomas, LLP

(57) ABSTRACT

A composition for a single-component polyurethane foam and a nozzle for spraying the same. The composition comprising a polyurethane pre-polymer dissolved in liquid hydrocarbons, wherein the polyurethane pre-polymer further comprises polyethers or polyesters, wherein at least one of the polyethers or polyesters is a diol with an average functionality $f=2$, a hydroxyl value within 35-180 mg KOH/g, and with an acid value not exceeding 0.2 mg KOH/g. The single-component polyurethane foam composition being sprayable onto a surface at a rate of 6 to 10 grams/second from the nozzle of the present invention wherein a coating depth of up to 30-55 mm is obtained over a 1 $m^2$ surface after one minute of product application. The nozzle of the present invention comprising design features to
(Continued)

produce a cone-shaped spray pattern of the foamable product.

7 Claims, 3 Drawing Sheets

Related U.S. Application Data application No. 15/172,575, filed on Jun. 3, 2016, now abandoned.

(60) Provisional application No. 62/294,974, filed on Feb. 12, 2016.

(51) Int. Cl.
| | | |
|---|---|---|
| *B05B 7/00* | (2006.01) | |
| *C08K 5/02* | (2006.01) | |
| *C08L 75/06* | (2006.01) | |
| *C08L 75/08* | (2006.01) | |
| *C08K 5/521* | (2006.01) | |
| *C08L 83/04* | (2006.01) | |
| *C08K 5/053* | (2006.01) | |

(52) U.S. Cl.
CPC .............. *C08L 75/06* (2013.01); *C08L 75/08* (2013.01); *C08K 5/053* (2013.01); *C08L 83/04* (2013.01)

(58) Field of Classification Search
CPC .... C08J 2375/04; B05B 7/0018; B05B 1/044; B05B 1/046
USPC ......................................................... 239/299
See application file for complete search history.

(56) References Cited

U.S. PATENT DOCUMENTS

| | | | | | |
|---|---|---|---|---|---|
| 2,768,101 | A * | 10/1956 | Fairchild | ................. | B05B 1/046 134/174 |
| 2,785,005 | A * | 3/1957 | Thompson | .............. | B05B 1/046 239/523 |
| 2,981,712 | A * | 4/1961 | Harper | ................. | C08G 18/089 524/364 |
| 2,985,386 | A * | 5/1961 | Steinen | ................. | B05B 1/042 239/597 |
| 3,085,754 | A * | 4/1963 | Thompson | .............. | B05B 1/046 239/505 |
| 3,101,906 | A * | 8/1963 | Webber | ................. | B05B 1/044 239/592 |
| 3,236,455 | A * | 2/1966 | Lewis | ..................... | B05B 9/01 239/11 |
| 3,301,493 | A * | 1/1967 | Frempter | ............... | B05B 1/046 239/476 |
| 3,313,353 | A * | 4/1967 | Williamson | ............ | A62C 31/00 169/47 |
| 3,401,888 | A * | 9/1968 | Sutter | .................... | B05B 1/044 239/14.2 |
| 3,556,411 | A * | 1/1971 | Nord | ....................... | B05B 1/00 239/581.1 |
| 3,647,147 | A * | 3/1972 | Cook | ...................... | B05B 1/042 239/599 |
| 3,659,787 | A * | 5/1972 | Ito | ........................... | B05B 1/02 239/599 |
| 3,737,108 | A * | 6/1973 | Stumphauzer | ............ | B05B 1/04 239/598 |
| 3,754,710 | A * | 8/1973 | Chimura | ................. | B05B 1/042 239/597 |
| 3,843,055 | A * | 10/1974 | Nord | ....................... | B05B 1/04 239/599 |
| 3,857,809 | A * | 12/1974 | Oertel | ................. | C08G 18/0852 528/48 |
| 3,927,162 | A * | 12/1975 | Stalter, Sr. | ............ | B29C 44/367 239/597 |
| 4,071,195 | A * | 1/1978 | Kuhns | .................... | B05B 1/267 239/289 |
| 4,097,000 | A * | 6/1978 | Derr | ....................... | B05B 1/042 239/599 |
| 4,117,551 | A * | 9/1978 | Brooks | ................. | B05B 7/1209 366/162.1 |
| 4,236,674 | A * | 12/1980 | Dixon | .................... | B05B 7/066 239/296 |
| 4,330,086 | A * | 5/1982 | Nysted | ................. | B05B 7/0068 169/5 |
| 4,346,849 | A * | 8/1982 | Rood | ....................... | B05B 1/00 239/597 |
| 4,618,101 | A * | 10/1986 | Piggott | ................. | B05B 1/042 239/589 |
| 4,641,785 | A * | 2/1987 | Grothe | ............... | B22D 11/1246 164/444 |
| 4,646,977 | A * | 3/1987 | Iwamura | .................. | B05B 1/02 239/590.5 |
| 4,759,500 | A * | 7/1988 | Hoffman | ................ | B01D 51/10 239/13 |
| 4,811,903 | A * | 3/1989 | Okuma | .................. | B05B 1/046 239/284.2 |
| 4,882,107 | A * | 11/1989 | Cavender | ............... | B05D 1/025 264/175 |
| 5,141,156 | A * | 8/1992 | Hoy | ........................ | B05B 7/32 239/135 |
| 5,143,302 | A * | 9/1992 | Sakuma | ................. | B05B 1/042 239/599 |
| 5,167,371 | A * | 12/1992 | Rohner | .................. | B05B 1/042 239/597 |
| 5,178,325 | A * | 1/1993 | Nielsen | .................. | B05B 1/042 239/1 |
| 5,178,326 | A * | 1/1993 | Kukesh | .................... | B05B 7/06 239/11 |
| 5,185,383 | A * | 2/1993 | Regenauer | ......... | C08G 18/4816 521/155 |
| 5,287,994 | A * | 2/1994 | Dempsey | ................. | B67D 3/00 111/7.1 |
| 5,464,154 | A * | 11/1995 | Nielsen | .................. | B05B 1/042 239/1 |
| 5,549,226 | A * | 8/1996 | Kopp | ..................... | B65D 83/303 222/402.13 |
| 5,597,122 | A * | 1/1997 | Eisenmann | ............ | B05B 1/042 239/589 |
| 6,136,942 | A * | 10/2000 | Pfenninger | ............ | C08G 18/12 252/182.2 |
| 6,371,392 | B1 * | 4/2002 | Steinman | ................ | B05B 1/323 239/533.13 |
| 6,414,045 | B1 * | 7/2002 | Heimpel | ................ | C08G 18/12 521/130 |
| 6,552,097 | B1 * | 4/2003 | Pauls | ..................... | C08G 18/10 222/491 |
| 6,894,083 | B2 * | 5/2005 | Braun | .................... | C08G 18/12 521/159 |
| 7,111,799 | B2 * | 9/2006 | Batich | ..................... | B21O 5/00 138/109 |
| 7,842,749 | B2 * | 11/2010 | Shalaby | ............... | A61L 26/0014 524/556 |
| 7,958,609 | B2 * | 6/2011 | Gaydoul | ................ | B21B 45/08 29/81.08 |
| 8,118,052 | B2 * | 2/2012 | Swab | ..................... | B29C 44/367 137/208 |
| 8,324,340 | B2 * | 12/2012 | Burckhardt | ............ | C08G 18/10 156/331.1 |
| 8,557,886 | B2 * | 10/2013 | Golini | ................ | C08G 18/4027 521/155 |
| 2003/0234301 | A1 * | 12/2003 | Swan | ..................... | B05B 1/046 239/429 |
| 2004/0124268 | A1 * | 7/2004 | Frazier | ................. | B01F 5/0256 239/398 |
| 2004/0157945 | A1 | 8/2004 | Barber | | |
| 2005/0150982 | A1 * | 7/2005 | Lopez | .................... | B60S 1/481 239/601 |
| 2006/0182978 | A1 | 8/2006 | Leroy et al. | | |

(56) References Cited

U.S. PATENT DOCUMENTS

| | | | |
|---|---|---|---|
| 2007/0039547 A1* | 2/2007 | Lacchia | B05B 1/046 118/629 |
| 2007/0069047 A1* | 3/2007 | Bolman | B05B 1/046 239/427 |
| 2008/0067720 A1 | 3/2008 | Wiese et al. | |
| 2008/0087745 A1* | 4/2008 | Pearson | B05B 1/046 239/428.5 |
| 2008/0290197 A1* | 11/2008 | Fecht | B05B 1/042 239/599 |
| 2009/0230221 A1 | 9/2009 | Ballu | |
| 2009/0272826 A1* | 11/2009 | Kioi | B05B 1/042 239/601 |
| 2011/0059255 A1* | 3/2011 | Ogonowski | B05B 1/042 427/422 |
| 2011/0121034 A1* | 5/2011 | Swab | B05B 7/0025 222/145.1 |
| 2013/0266736 A1* | 10/2013 | Wickert | C09D 7/1216 427/427 |
| 2014/0051776 A1* | 2/2014 | Chen | C08G 18/1808 521/126 |
| 2014/0224828 A1* | 8/2014 | Demey | B05B 1/3073 222/23 |
| 2015/0018508 A1 | 1/2015 | Verbeke et al. | |
| 2015/0018509 A1 | 1/2015 | Verbeke et al. | |
| 2015/0144249 A1 | 5/2015 | Bowe et al. | |
| 2015/0217336 A1* | 8/2015 | Seidel | B21B 45/0233 134/15 |
| 2015/0274967 A1 | 10/2015 | Taylor | |
| 2015/0321206 A1* | 11/2015 | Swan | B05B 1/046 239/8 |
| 2016/0271666 A1* | 9/2016 | Huber | B08B 3/022 |
| 2016/0288075 A1* | 10/2016 | Lacroix | B05B 1/044 |
| 2016/0318050 A1* | 11/2016 | Zaarbelink | B05B 7/2472 |
| 2017/0225181 A1* | 8/2017 | Hammerlund | B05B 7/0018 |
| 2017/0241131 A1* | 8/2017 | Lewis | E04B 1/7625 |
| 2017/0333927 A1* | 11/2017 | Ross | B05B 7/0018 |
| 2017/0341090 A1* | 11/2017 | Cameron | B05B 1/046 |
| 2017/0348713 A1 | 12/2017 | Titorov | |
| 2018/0029566 A1* | 2/2018 | Gopalan | B60S 1/46 |
| 2018/0043376 A1* | 2/2018 | Titorov | B05B 1/005 |
| 2018/0043379 A1* | 2/2018 | Gantenbein | B05B 7/0408 |
| 2018/0104705 A1 | 4/2018 | Slutskii et al. | |
| 2018/0104709 A1* | 4/2018 | Peters | B05B 7/0416 |
| 2018/0111140 A1* | 4/2018 | Miller | B01F 5/0602 |
| 2018/0117609 A1* | 5/2018 | Hodgkinson | B05B 7/1693 |

\* cited by examiner

COMPOSITION OF AND NOZZLE FOR SPRAYING A SINGLE-COMPONENT POLYURETHANE FOAM

CROSS-REFERENCE TO RELATED APPLICATION

This patent is a divisional of U.S. patent application Ser. No. 15/429,586 (filed Feb. 10, 2017), which is a continuation-in-part of U.S. patent application Ser. No. 15/172,575 (filed Jun. 3, 2016). This application also claims the benefit of U.S. Provisional Patent Application Ser. No. 62/294,974, entitled "One-Component Fire Resistant Polyurethane Foams and Nozzle for Application Thereof," filed Feb. 12, 2016. Applicant incorporates the following patent applications in their entirety by this statement herein.

TECHNICAL FIELD

This invention relates to a composition for a single component pre-polymer of polyurethane insulating foam and a spray nozzle that incorporates a metering opening to provide for a uniform fan-shaped distribution of the foamed product.

BACKGROUND

Polyurethane foam is increasingly being used as a sealant in both residential and commercial building construction for sealing spaces between door and window frames, in addition to more traditional uses such as insulation. When used as an insulator, polyurethane foam essentially fills any air space between the wall frames of a structure and thereby allows such insulated buildings to require substantially less energy to keep heated or cooled. Further, the foam can be sprayed to insulate spaces as a substitute for electric space heaters.

Polyurethane foam for on-site applications is typically supplied as a "single-component" foam or as a "two-component" foam. With both types of foam, the chemicals which create the foam are typically carried in portable containers, i.e. pressurized cylinders, and applied by an operator via an application gun. For two-component polyurethane foam systems, the two-part products harden by a chemical reaction of a resin and hardener, typically having a relatively short pot life, and may expose users to isocyanates or other toxic compounds. In a two-component foam composition, a reaction between methylene diphenyl diisocyanate (MDI) and glycols takes place directly during the spraying process, which releases to the atmosphere numerous hazardous emissions. During application of a two-component foam, the pressurized cylinders containing the foamable agents and the hardener are connected to a type of spray gun where the components are mixed in appropriate ratios via metering mechanisms contained in the gun and are subsequently sprayed.

There are two principle problems with two-component polyurethane foam systems. One problem is that the guns are typically made of stainless steel and/or brass and contain precise metering mechanisms that must be cleaned shortly after use. The guns must be cleaned shortly after use because in a two-component system, the foam hardens within a relatively short period of time via chemical reaction with the isocyanate hardener. If the foam is allowed to harden within a gun, the relatively costly gun becomes unusable and typically requires disassembly and the replacement of numerous parts in the metering mechanism to return the gun to a usable state.

The other principle problem with two-component polyurethane foam systems is that the isocyanate-based hardener is extremely toxic to the human nervous system. Isocyanates are readily absorbed via inhalation of vapor and skin contact. Therefore, the use of protective clothing and specialized respirators are required by workers applying a two-component polyurethane foam product.

To overcome some of the problems of two-component polyurethane foam systems, one-component foam products have been developed. In a one-component foam product, generally the resin or foamable component and the isocyanate component are supplied in a single pressurized container and dispensed through the container through a valve equipped gun, equipped with a nozzle attached to the pressurized container. With one-component polyurethane foam systems, when the foamable chemicals leave the nozzle reaction with moisture in the air causes the foam to harden. One component polyurethane foam products typically feature less overspray and introduce fewer airborne isocyanates to the atmosphere surrounding the worksite and are otherwise generally less toxic and safer to use than two-component foam systems.

With the development of single-component polyurethane foam systems, a need has arisen in the art for new foam application hardware that takes advantage of the fact that with a single-component system, there is no need to mix chemical components from two pressurized sources in precise ratios. Ideally, a new single-component foam application system would utilize low cost, easily transportable and easy to clean hardware which would allow the use of single-component polyurethane foams in a wider range of applications.

One-component polyurethane foams are used in the construction trades for filling and insulating walls, as well as for acting as a sealant and/or an adhesive. One-component polyurethane foams are particularly well suited for on-site application. They can essentially be used in any other industry where quality insulation is required. On-site applications for polyurethane foam have increased substantially in recent years extending the application of polyurethane foam beyond its traditional usage in the packaging and insulation fields. For example, polyurethane foam is increasingly being used as a sealant in both residential and commercial building construction for sealing spaces between door and window frames, in addition to more traditional uses as an insulation. In cold weather climates, polyurethane foam is now commonly used as an insulator to fill essentially any air space between the wall frames of a structure. Such insulated buildings require substantially less energy to heat than non-insulated buildings.

One-component polyurethane foams play an important role in improving energy efficiency, significantly improving window and door installation tasks. They can also be used for construction purposes (walls/partitions), and thermal insulation of attic floors, roofs, and basements, etc. In the automotive industry, they can be used as heat and noise insulation, as thermal insulation of refrigerators and insulated tank trucks, etc. In ship building, they can be used for heat-insulating of bulkheads, which prevents the formation of vapors.

Further, one-component polyurethane foams are ecologically-friendly because the main reaction of polymerization of polyisocyanate and polyol to form an isocyanate prepolymer takes place inside a pressured spray canister or spray can. The isocyanate prepolymer represents an intermediate stage in the polymerization process. Isocyanate group-containing prepolymers (isocyanate prepolymer), contained in one-component polyurethane foam compositions are known to those of skill in the art. Such prepolymers are commercially available and usually synthesized by the reaction of one or more polyols, such as a polyester or polyether.

However, most commercially available one-component foams come out in a tiny stream, which makes them suitable only for small-scale insulation (insulating cracks, holes, etc.) Therefore, there is a need in the art for a chemical composition for a one-component polyurethane foam having a viscosity and other characteristics that make the product particularly well-suited for being dispensed from a typical aerosol container, i.e. a spray can, and having a cone-shaped stream with a width of approximately 100 mm to approximately 400 mm.

There is also a need for a spray can nozzle capable of dispensing or spraying a one-component polyurethane foam of appropriate viscosity, at the pressures typically available from a spray can (about 3.5 to 12 atm), wherein the nozzle dispenses the foamable product at a mass flow rate of approximately 6 grams per second to approximately 10 grams per second. Experimentation has shown that such a mass flow rate is capable of covering a 1 $m^2$ surface with a foam layer having a thickness of approximately 30-50 mm after an application time of approximately 1 minute.

SUMMARY OF THE INVENTION

The present invention is directed to a chemical composition for a pre-polymer dissolved in liquid hydrocarbons, the method of production thereof, and the method of use. The pre-polymer of polyurethane comprises polyethers or polyesters, wherein at least one of the polyethers or polyesters is a diol with an average functionality of $f=2$, a hydroxyl value within 35-180 mg KOH/g, with an acid value not exceeding 0.2 mg KOH/g, and a PH within 4-8.5.

The present invention is further directed to a nozzle suitable for spraying chemical compositions at a mass flow rate of approximately 6 grams per second to approximately 10 grams per second at the pressures available in common spray cans, i.e. about 3.5 to 12 atm.

The polyurethane pre-polymer is used for producing polyurethane foams, which are used particularly for providing insulation. The composition of the present invention allows it to be sprayed from a spray can equipped with a suitable nozzle onto a surface with a coverage of about 1 $m^2$ per minute of application wherein a depth of coating of about 30-55 mm is achieved. The composition cures through reaction with ambient moisture in the atmosphere.

The nozzle of the present invention includes design features to produce a cone-shaped spray pattern of the foamable product and is also designed to reduce the incidence of leakage or dripping of either moisture or the foam product at the nozzle's outlet.

DETAILED DESCRIPTION OF THE INVENTION

Figure 1:
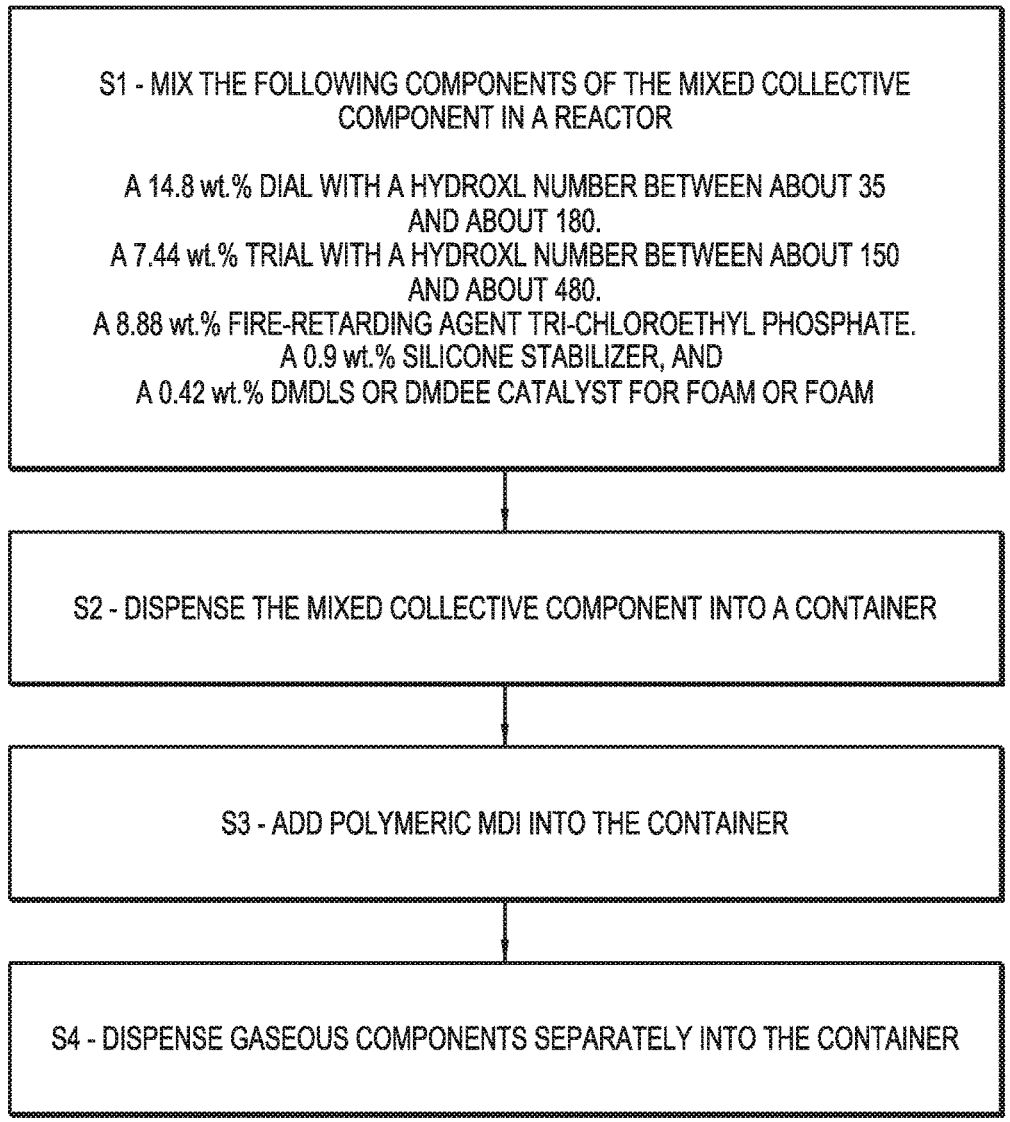
FIG. 1 shows a flow diagram of an exemplary method of production of the composition of the present invention.
Figure 2:
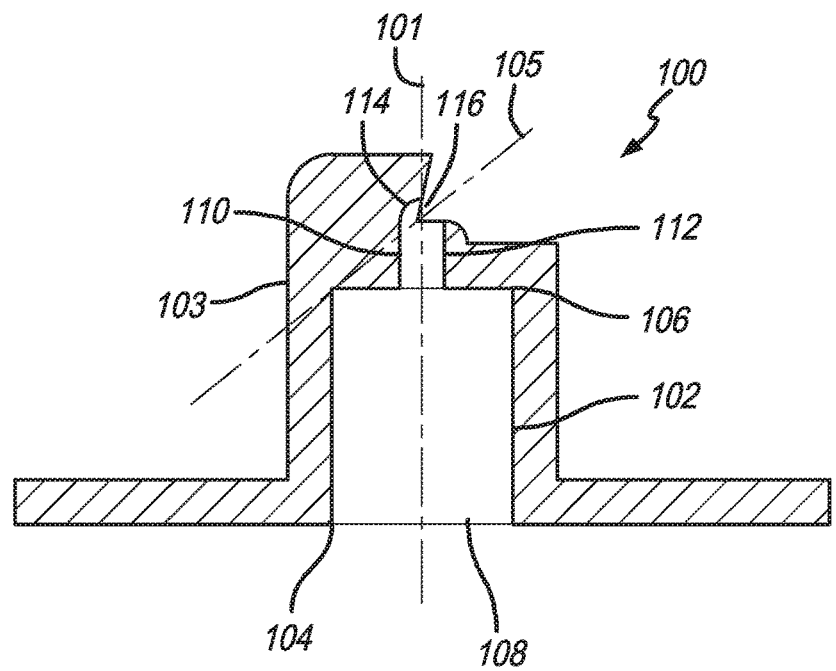
FIG. 2 shows a cross-sectional side view of the nozzle for spraying the composition of the present invention.
Figure 3:
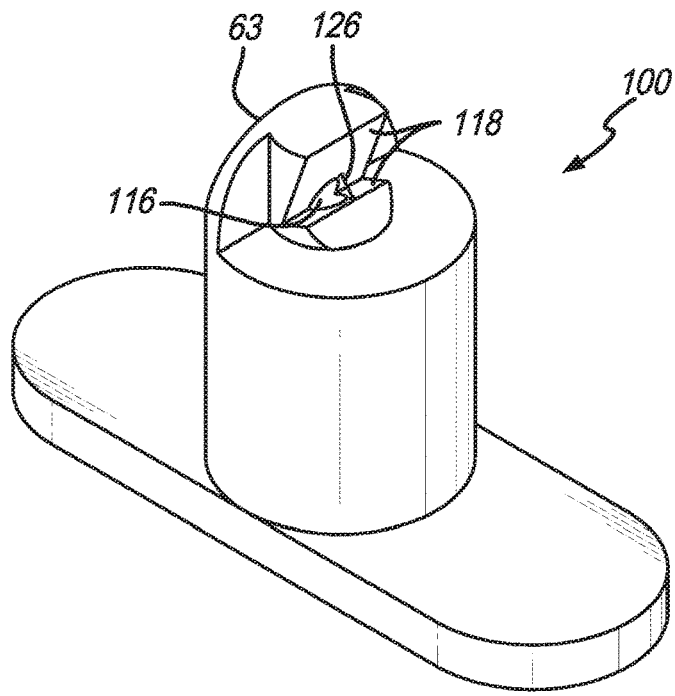
FIG. 3 shows a perspective view of the nozzle for spraying the composition of the present invention.

The detailed description set forth below in connection with the appended drawing is intended as a description of presently preferred embodiments of the invention and is not intended to represent the only forms in which the present invention may be constructed or utilized. The description sets forth the functions and the sequence of steps for constructing and operating the invention in connection with the illustrated embodiments. It is to be understood. however, that the same or equivalent functions and sequences may be accomplished by different embodiments that are also intended to be encompassed within the spirit and scope of the invention.

Unless otherwise stated, the following terms as used herein have the following definitions.

"Hydroxyl number" of a polyol refers to the concentration of hydroxyl groups, per unit weight of the polyol, that are able to react with isocyanate groups. Hydroxyl number is reported as mg KOH/g, and is measured according to the standard ASTM D 1638.

The "average functionality", or "average hydroxyl functionality" of a polyol indicates the number of OH groups per molecule, on average. The average functionality of an isocyanate refers to the number of —NCO groups per molecule, on average.

The meaning of the term "isocyanate prepolymer" includes but is not limited to comprising a mixed polyisocyanate and a polyol in a liquid state.

The meaning of the term "polyisocyanate" includes but is not limited to di or higher isocyanates. The meaning of the term "polyol" includes, but is not limited to, mixtures of polyol and any polyol that can react in a known fashion with an isocyanate in preparing polyurethane foam. A polyol typically contains more than one hydroxyl group, wherein molecules that contain two hydroxyl groups are "diols" and those that contain three hydroxyl groups are "triols," etc.

The meaning of the term "container" refers to a pressurized container such as a pressurized spray can or pressured spray canister, or like device.

The term "single-component" is defined to contrast the prior art "two-component" polyurethane foam, which hardens by a chemical reaction of a resin and hardener, more specifically a reaction between methylene diphenyl diisocyanate (MDI) and glycols that takes place directly during the spraying process. The "single-component" aspect of the polyurethane foam, although it comprises multiple components/ingredients, refers to the main reaction of polymerization of polyisocyanate and polyol forming an isocyanate prepolymer inside a container, which then hardens through reacting with ambient moisture in the atmosphere.

A single-component polyurethane foam may comprise an isocyanate prepolymer filled into a pressurized spray canister or spray can together with at least one blowing agent or hydrocarbon propellant. A user then, for example, may bring the isocyanate prepolymer out of the pressurized spray canister, while the components of the isocyanate prepolymer cure by cross-linking during reaction with ambient moisture.

The invention accordingly relates to a single-component polyurethane foam comprising at least one polyester or polyether, wherein at least one of them must be a diol with an average functionality $f=2$, and therefore a linear polymer formed by polymerizing (i.e., a thermoplastic), a hydroxyl value between about 35-180 mg KOH/g, water within the polyester, if present, with volume less than 0.80 wt. %, a pH value of the polyester between about 4-8.5, an acid value below or equal to 0.2 mg KOH/g, and a propellant or blowing agent, preferably hydrocarbon-based and of an alkaline type having the formula $C_nH_{(2n+2)}$ (n being equal to or between 2 and 5).

The functionality of a monomer molecule is the number of functional groups that participate in the polymerization. Monomers with functionality greater than two will introduce branching into a polymer, and the degree of polymerization will depend on the average functionality fav per monomer unit.

Example

In the preferred embodiment, the one-component polyurethane pre-polymer composition comprises:

| Components | Parts by Weight |
|---|---|
| a diol with a hydroxyl number between about 75 and about 135 | 14.8 wt. % |
| a triol with a hydroxyl number between about 240 and about 260 | 7.44 wt. % |
| a fire-retarding agent tri-chloroethyl phosphate | 8.88 wt. % |
| a silicone stabilizer | 0.9 wt. % |
| a DMDLS or DMDEE catalyst for foams or their mix | 0.42 wt. % |
| a polyisocyanate (MDI, NCO % = about 30.5% to about 32%) | 42.7 wt. % |
| a dimethyl ether | 3.88 wt. % |
| a propane | 4.17 wt. % |
| An Isobutane | 9.7 wt. % |
| Freon 152 | 7.11 wt. % |

Herein, the weight percentages combining to total 100%, with water volume within the polymer, if present, to be less than 0.1%.

The single-component polyurethane foam may be prepared by mixing the following components into a mixed collective component in a reactor (S1):

a, preferably 14.8 wt. %, diol with a hydroxyl number between about 75 and about 135, a, preferably 7.44 wt %, triol with a hydroxyl number between about 150 and about 480, a, preferably 8.88 wt %, tire-retarding agent tri-chloroethyl phosphate, a, preferably 0.9 wt %, silicone stabilizer, and a, preferably 0.42 wt %, DMDLS or DMDEE catalyst for foams or their mix.

Afterwards, the mixed collective component is introduced into the container (S2) and polymeric MDI and all other gaseous components are introduced separately into the container (S3).

Experimental results show that the composition of the present invention is an improvement over the prior art because it allows to form a cone-shaped stream, while retaining all of the product's qualities (adhesiveness, structural uniformity, eco-friendliness, etc.) Hence, the present invention is the first one-component polyurethane foam, which has functionality of two-component polyurethane foams in that it is able form a wide cone-shaped stream.

Further, the chemical composition, comprising polyurethane pre-polymer dissolved in liquid hydrocarbons, or other volatile polar solvents, would be in a suspended condition wherein the polymer would be exposed with the gases, namely the hydrocarbon propellant matching the formula $C_nH_{(2n+2)}$ (n being equal to or between 2 and 5), or any combination of such hydrocarbons. The volume of the gases must be considerably larger than pre-polymer in the system, and must compound to more than 20 wt. %. Further, in the preferred embodiment, the hydrocarbon is a halogenoalkane gas, which not only participates in foaming and formation of a spongy polymer, but also plays a role in spreading the polymer homogeneously over a surface from the distance.

Further, the composition is suitable for use for general insulation purposes, particularly well-suited to be sprayed from a pressurized container, such as a spray can. With a suitable nozzle, the foam composition of the present invention can be sprayed over a surface with a capacity of 1 m²/minute, at a flow rate of the spray of approximately 6 grams per second to approximately 10 grams per second, and gaining a thickness of the coated layer up to 30-50 mm, at typical spray can operating pressures of about 3.5 to 12 atm.

The round slot-shaped orifice allows the polymer to be sprayed over a surface in one very smooth layer; and so that after the final foaming, which takes place not earlier than 15 minutes after spraying, the layer will be smooth and uniform. Other geometrical configurations of the orifice can cause irregularities to the sprayed layer on a surface, which may lead to excessive consumption of product from the spraying system. Further, the viscosity of the product may be varied as necessary to allow the product to be sprayed from spray equipment operating with greater or smaller orifice openings and/or at higher or lower internal pressures.

With reference to FIGS. 2-5, a nozzle 100 of the present invention includes a pressure chamber 102 having a proximate end 104 and distal end 106 with a generally circular bore 108 therebetween. The circular bore has a diameter. Immediately adjacent the pressure chamber 102 is a nozzle head 103. In fluid communication with the distal end 106 of the generally circular bore 108 of the pressure chamber 102 is a discharge tube 110, having a diameter 121 and a proximate end 112, which is exposed to the generally circular bore 108 of the pressure chamber 102. The discharge tube 110, having a central axis 101, terminates at a distal end 114, which terminates at a round slot-shaped discharge orifice 116. The diameter 121 of the discharge tube 110. is less than half the diameter of the circular bore 108.

In the exemplary embodiment, formed into the nozzle head 103 are inwardly angled v-shaped walls 118 (see FIG. 3), forming a 60 degree angle that has a bisecting angle 105. The inwardly angled v-shaped walls 118 comprise a front wall and a rear wall and intersect with and cut through a portion of the round slot-shaped discharge orifice 116, such that the bisecting angle 105 is 45 degrees from the central axis 101 of the discharge tube 110. The rear wall has a length that is greater than a length of the front wall. Accordingly, the length 122 of the round slot shaped orifice 116 corresponds to the diameter 121 of the discharge tube 110.

Figure 4:
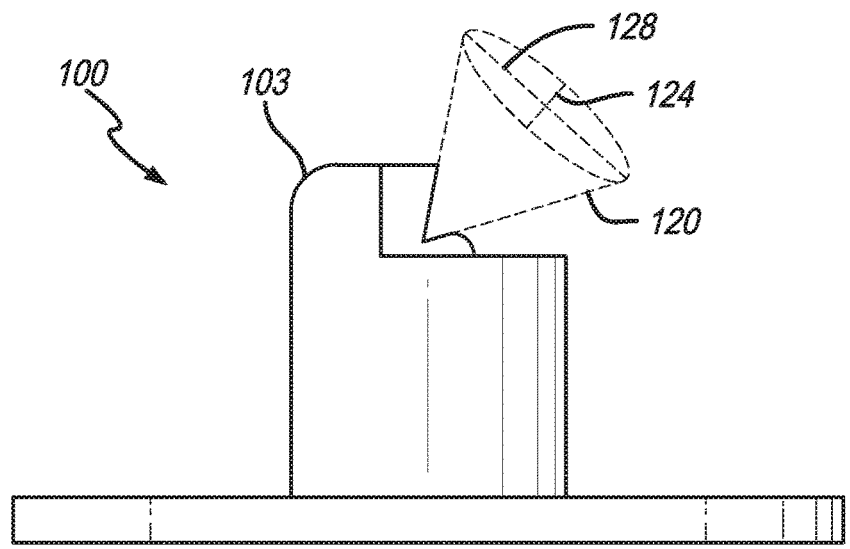
FIG. 4 shows a side view of the nozzle for spraying the composition and the spray pattern of the present invention.
Figure 5:
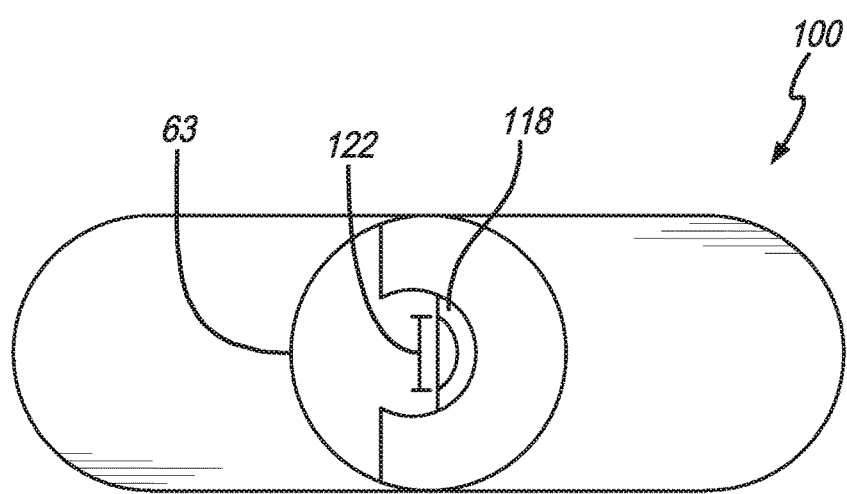
FIG. 5 shows a top view of the nozzle for spraying the composition of the present invention.

As shown in FIG. 4, the shape of the round slot-shaped discharge orifice 116 allows foamable product to be dispensed from the pressurized source of sprayable foam material in a cone-shaped pattern 120. The length 122 of the round slot-shaped discharge orifice 116 tends to control the effective length 124 of the cone-shaped spray pattern 120. The width 126 of the round slot-shaped discharge orifice 116 tends to control the width 128 of the spray pattern 120.

Experimentation has shown that the nozzle 100 having a round slot-shaped orifice 116 helps the foam achieve a uniform structure. Experimentation has further shown that the length 122 of the round slot-shaped orifice 116 should ideally be approximately 1.1 mm to approximately 3.5 mm, or ideally at 2 mm.

Experimental results have shown that the polyurethane foam composition of the present invention when loaded in a spray can with an operating pressure of 3.5 to 12 atm and equipped with the nozzle 100 of the present invention provides structural uniformity in the sprayed foam, as well as high adhesiveness, such that the sprayed foam could not be easily removed from a surface. Further, experimental results also show that, when the nozzle 100 of the present invention is used with other one-component polyurethane compositions, the following results are obtained:

When other one-component polyurethane compositions' foams are cut in half, they have ununiformed structures—there were big and small holes.

Half of the other one-component polyurethane compositions' foams were spraying tiny streams (unlike the foam of the present invention that comes out in a wide cone), and the other half of the one-component polyurethane compositions' foams hardly came out at all.

All other one-component polyurethane compositions' foams had low adhesiveness, such that we could easily remove the sprayed foams from a surface (unlike the foam of the present invention that could not be removed from the surface without equipment).

The maximum thickness of the coating layer of all other one-component polyurethane compositions' foams was approximately 1 cm (while thickness of the coating layer of the foam of the present invention reached up to approximately 5 cm).

What is claimed is:

1. A dispensing system for spraying pressurized foamable material, comprising:
   a. a composition of a single-component polyurethane foam, comprising:
      i. a diol with a hydroxyl number between about 35 and about 180;
      ii. a triol with a hydroxyl number between about 338 and about 480;
      iii. a fire-retarding agent;
      iv. a silicone stabilizer;
      v. a catalyst comprising 2,2-dimorpholinodiethylether;
      vi. a polyisocyanate (MDI, NCO %=about 30.5% to about 32%);
      vii. a dimethyl ether;
      viii. propane;
      ix. isobutane; and
      x. 1,1-difluoroethane;
      xi. wherein, if present, water volume within the diol is less than 0.8 wt. %;
   b. a nozzle for spraying the composition of a single-component polyurethane foam comprising:
      i. a pressure chamber having a proximate end and distal end with a generally circular bore therebetween, the circular bore having a diameter;
      ii. a discharge tube having a central axis, a proximate end, and terminating at a distal end that terminates in a discharge orifice in the form of a circular shape, the discharge tube having a diameter less than half the diameter of the circular bore;
      iii. a nozzle head immediately adjacent to the pressure chamber comprising an inwardly angled front wall and an inwardly angled rear wall that form a V-shape and intersect with and cut through a portion of the discharge orifice and forming an acute angle that has a bisecting angle, such that the bisecting angle is 45 degrees from the central axis of the discharge tube, wherein the rear wall has a length that is greater than a length of the front wall,
      iv. wherein the discharge tube is exposed to the generally circular bore of the pressure chamber and in fluid communication with the distal end of the generally circular bore of the pressure chamber, and
   c. a pressurized container attachable to the nozzle, wherein the pressurized container contains the composition of a single-component polyurethane foam to be sprayed from the nozzle.

2. The dispensing system for spraying pressurized foamable material according to claim 1, wherein the bisecting angle is approximately 35 to 55 degrees from the central axis of the discharge tube.

3. The dispensing system for spraying pressurized foamable material according to claim 1, wherein the bisecting angle is 45 degrees from the central axis of the discharge tube.

4. The dispensing system for spraying pressurized foamable material according to claim 3, wherein the acute angle is approximately 45 to 75 degrees.

5. The dispensing system for spraying pressurized foamable material according to claim 4, wherein the acute angle is approximately 60 degrees.

6. The dispensing system for spraying pressurized foamable material according to claim 5, wherein
   a. the diol has a hydroxyl number between about 95 and about 115 is at 14.8 wt. %;
   b. the triol is at 7.44 wt %;
   c. the fire-retarding agent is at 8.88 wt %;
   d. the silicone stabilizer is at 0.9 wt %;
   e. the 2,2-dimorpholinodiethylether is at 0.42 wt %;
   f. the polyisocyanate is at 42.7 wt %;
   g. the dimethyl ether is at 3.88 wt %;
   h. the propane is at 4.17 wt %;
   i. the Isobutane is at 9.7 wt %; and
   j. the 1,1-difluoroethane is at 7.11 wt %.

7. The system of claim 1, wherein when the composition is sprayed, the composition is sprayed in a cone-shaped pattern.

\* \* \* \* \*